United States Patent [19]

Yamaguchi et al.

[11] Patent Number: 4,727,411
[45] Date of Patent: Feb. 23, 1988

[54] MIRROR IMAGE GENERATOR FOR COMPOSITE SIGNALS WITH CHROMA INVERSION

[75] Inventors: Shinichi Yamaguchi; Yasuo Takemura, both of Tokyo; Tadashi Sugiki, Yokohama, all of Japan

[73] Assignee: Kabushiki Kaisha Toshiba, Kawasaki, Japan

[21] Appl. No.: 853,146

[22] Filed: Apr. 17, 1986

[30] Foreign Application Priority Data

Apr. 17, 1985 [JP] Japan .................................. 60-82052
Apr. 17, 1985 [JP] Japan .................................. 60-82056

[51] Int. Cl.$^4$ ........................................... H04N 9/74
[52] U.S. Cl. ................................................ 358/22
[58] Field of Search ............................ 358/22; 380/14

[56] References Cited

U.S. PATENT DOCUMENTS

| | | | |
|---|---|---|---|
| 4,070,693 | 1/1978 | Shulterly ........................ | 380/14 |
| 4,134,128 | 1/1979 | Hurst ............................... | 358/22 |
| 4,220,965 | 9/1980 | Heitmann et al. ............. | 358/22 |
| 4,405,942 | 9/1983 | Block et al. ..................... | 380/14 |

FOREIGN PATENT DOCUMENTS

| | | | |
|---|---|---|---|
| 22830 | 2/1977 | Japan ............................... | 358/22 |
| 31282 | 2/1982 | Japan ............................... | 358/22 |

OTHER PUBLICATIONS

"Mechanism of Mirror Image Display", Television Technique, p. 19-14, May 1984.

Primary Examiner—John W. Shepperd
Attorney, Agent, or Firm—Finnegan, Henderson, Farabow, Garrett & Dunner

[57] ABSTRACT

The mirror image generator for composite signals with chroma inversion includes a first step of orthogonally modulating first and second color difference signals by first and second subcarriers where the subcarriers have 0° and 270° phases with respect to a 90° reference phase; a second step of digitalizing the orthogonal modulation signals; a third step of writing the digitalized orthogonal modulation signals into 2 one horizontal period memories in a predetermined address sequence; and a fourth step of processing a phase transition order of the orthogonal modulation signals resulting in a different phase transition order in which the orthogonal modulation signals are read out of the horizontal period memory such that for a first predetermined amount of data, both the write address sequence and the read address sequence are the same with respect to each other, and for a second predetermined amount of data, the read address sequence is in reverse order from the write address sequence, and for a third predetermined amount of data, both the write and read address sequences are the same with respect to each other.

7 Claims, 9 Drawing Figures

MIRROR IMAGE GENERATOR FOR COMPOSITE SIGNALS WITH CHROMA INVERSION

BACKGROUND OF THE INVENTION

1. Field of the Invention

The present invention relates to a television receiver, and more perticularly to a time base inversion method of chroma signals and a circuit therefor.

2. Description of Prior Art

Recently a technique to obtain mirror images on a display screen of, e.g., a televison receiver has been developed. The mirror images are generally obtained by inverting the time base of video signals in a horizontal period.

Figure 1:
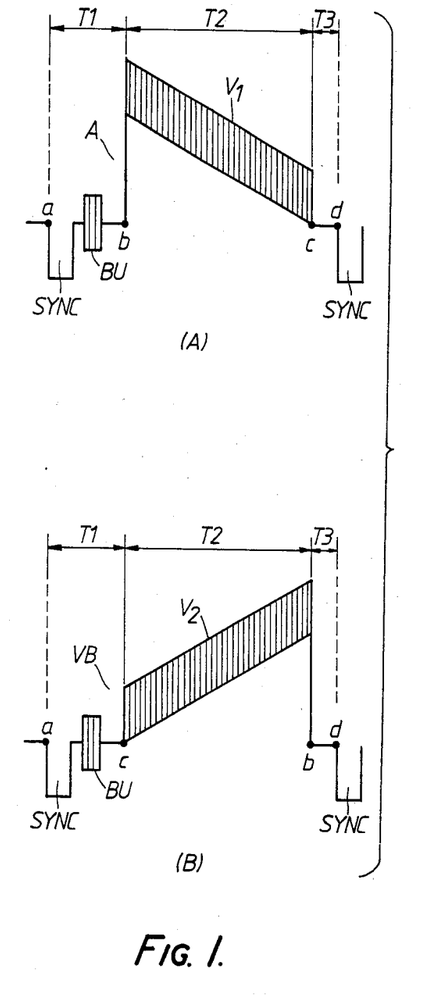
FIG. 1 are diagrams illustrating a one horizontal period signal waveform for explaining a time base inversion of a video signal.

In the NTSC system, for example, a one horizontal period signal of television signals is formatted as shown in FIG. 1 which shows a relation of a composite video signal VA (see FIG. 1(A)) to its modulation time base in the one horizontal period. A video signal V1 to be displayed on each one horizontal line is assigned a video signal period T2 of the one horizontal period signal, that is, in a predetermined period defined by codes b and c on the modulation time base. Now, codes a, d, and codes b and c, previously mentioned, shall be applied on the modulation time base, for defining leading ends or trailing ends of the one horizontal period or respective periods in the one horizontal period. Video signal V1 in video signal period T2 constitutes composite video signal VA, together with a horizontal synchronizing signal SYNC and a burst signal BU both assigned in leading blanking period T1.

Generally the mirror images are obtained by converting composite video signal VA so that the time base of video signal V1 assigned in video signal period T2 is inverted. Then another composite video signal VB as shown in FIG. 1(B) is obtained in reference to its modulation time base. Composite video signal VB as converted is constituted by burst signal BU, horizontal synchronizing signal SYNC, as they are in FIG. 1(A) and a video signal V2 whose modulation time base is inverted in contrast to video signal V1 in FIG. 1(A). That is, horizontal synchronizing signal SYNC and burst signal BU in leading blanking period T1 are not changed, but video signal V1 in video signal period T2 is changed to video signal V2. For example, signal states of video signal V2 at its leading end c and trailing end b correspond to the signal states of video signal V1 at its trailing end c and leading end b, respectively, where, leading end b and trailing end c of video signal V1 are reversed respectively to leading end c and trailing end b of video signal V2. Therefore, the modulation time base of video signal V1 is inverted with respect to the time sequence in video signal period T2.

The conversion of video signal V1 (FIG. 1(A)) to video signal V2 (FIG. 1(B)) for obtaining the mirror images can be carried out by using memory devices to store composite video signal VA of the one horizontal period and address control means for the memory devices.

A writing of the composite video signal data into the memory devices is carried out in order from the entire extent of the one horizontal signal period in FIG. 1(A), i.e., from its leading end a through its trailing end d. A reading of the stored composite video signal data out of the memory devices is carried out in the normal order for the data in leading blanking period T1, i.e., from its leading end a through its trailing end b, in a reversed order from the data in video signal period T2, i.e., from its trailing end c through its leading end b, and in the normal order for the data in trailing blanking period T3, i.e., from its leading end c through its trailing end d. Therefore, when the read sequence in video signal period T2 is carried out in the inverse direction to the write sequence, an inversion of the time base of the video signal (hereinafter referred to as the inversion in leftside right) is carried out. As mentioned above, video signal V2 (FIG. 1(B)) as inverted in leftside right can be obtained.

However, there are serious problems in the conventional systems for obtaining the mirror images in regard to a chroma signal in the video signal. The problems occur due to a phase disturbances of the chroma signal.

Figure 2:
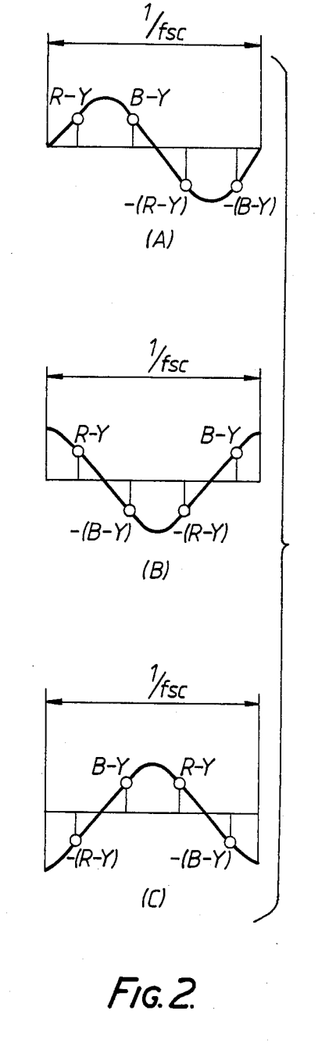
FIG. 2 are diagrams illustrating a chroma signal and its modulation axis for explaining problems at a time base inversion of the chroma signal.

Referring now to FIG. 2, the problems will be explained below in detail. FIG. 2(A) shows an example of the chroma signal before the video signal is inverted in leftside right, in which a modulation angle for the chroma signal repeats the phase transition order of color difference signals R-Y and B-Y, i.e., the phase order of (R-Y), (B-Y), −(R-Y) and −(B-Y). When a read phase agrees with the phase axis of the R-Y signal, the phase of the chroma signal is converted in another phase transition order corresponding to the phase order of (R-Y), −(B-Y), −(R-Y) and (B-Y) as shown in FIG. 2(B) upon the inversion of the video signal in leftside right. As a result, the signs of (B-Y) components of the chroma signal can be inverted so that the phase transition order of the chroma signal V2 as inverted becomes different from the original order. Further, in case the read phase agrees with the phase axis of the B-Y signal, the phase of the chroma signal is converted in the order of −(R-Y), (B-Y), (R-Y) and −(B-Y) as shown in FIG. 2(C), so that the signs of the (R-Y) components of the chroma signal can be inverted, and the phase transition order of the chroma signal V2 as inverted also becomes different from the original order.

As a result, in displaying the mirror images on a display screen, the mirror images are characterized by a serious color turbulence.

SUMMARY OF THE INVENTION

An object of the present invention is to provide a method for time base inversion method of chroma signals for displaying images on a display screen without disturbing colors or hues of the images and a circuit therefor.

These and other objects are achieved in the method for time base inversion of chroma signals of this invention which includes a first step of orthogonally modulating first and second subcarriers by first and second color difference signals, a second step of digitalizing orthogonal modulation signals obtained through the first step, a third step of writing digitalized orthogonal modulation signals obtained through the second step into one horizontal period memory in a predetermined address sequence, and a fourth step of processing a phase transition order of the orthogonal modulation signals so as that another phase transition order, which results from the written orthogonal modulation signals being read from the one horizontal period memory in backward address sequence in contrast to the predetermined writing address sequence, corresponds to the original phase transition order of the orthogonal modulation signals.

Additional objects, advantages, and features of the present invention will be apparent to persons skilled in the art from a study of the following description and from the accompanying drawings, in which:

DESCRIPTION OF THE PREFERRED EMBODIMENTS

The present invention will now be described in detail with reference to the accompanying drawings, namely, FIGS. 1 to 9. Throughout the drawings, like reference numerals and letters are used to designate equivalent elements for the sake of simplicity of explanation.

Figure 3:
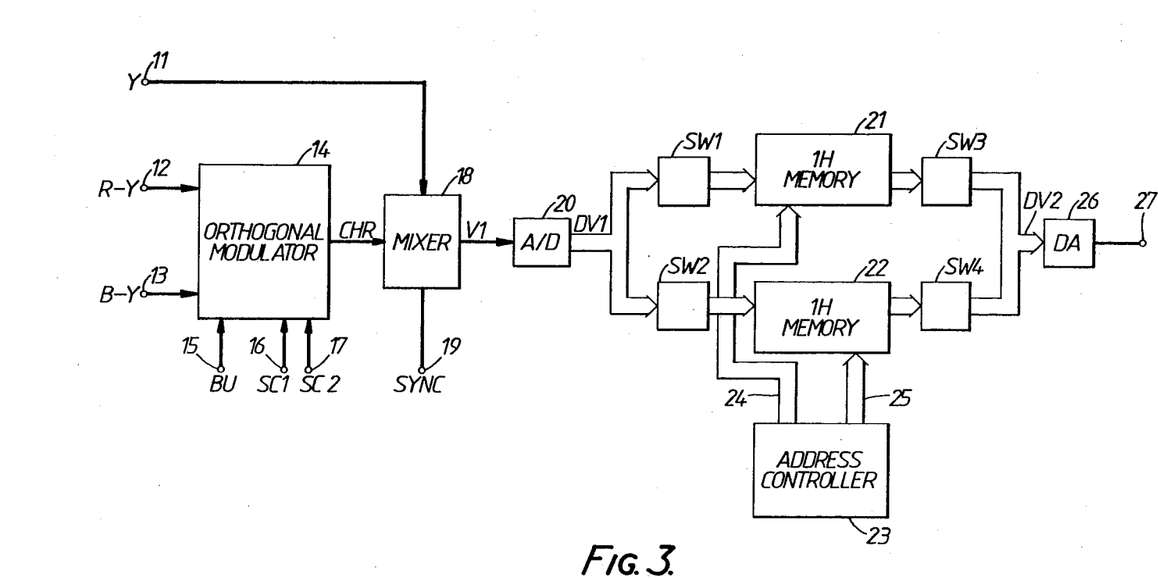
FIG. 3 is a block circuit diagram for performing a time base inversion of a chroma signal according to the present invention.

Referring now to FIG. 3, there is shown a block diagram of an embodiment of the present invention. In FIG. 3, input terminals 11, 12 and 13 are provided to receive a luminance signal Y, an R-Y and a B-Y color difference signal from a signal separation section of a video camera. In the video camera, color signals Y, R and B are generated and then the R and B color signals are converted to the Y-R and Y-B color difference signals. Input terminal 11 is coupled to a mixer 18, while input terminals 12 and 13 are coupled to an orthogonal modulator 14. Orthogonal modulator 14 is further coupled to additional input terminals 15, 16 and 17 which are provided to receive a burst signal BU and first and second subcarriers SC1 and SC2 from a burst oscillator (not shown) and phase shifters (not shown) for shifting the output phases of the burst oscillator. Where first and second subcarriers SC1 and SC2 have their phases shifted 0° and 270° in reference to a standard phase of burst signal BU for carrying out the leftside right inversion of the composite video signal. Mixer 18 is also coupled to additional input terminal 19 which is provided to receive a synchronizing signal SYNC from the tuner section. The R-Y signal and B-Y signal are orthogonally modulated together with subcarriers SC1 and SC2 in orthogonal modulator 14, respectively. As a result, a chroma signal CHR is obtained at an output end of orthogonal modulator 14 together with burst signal BU. Then signals CHR and BU are transmitted to mixer 18 which is connected to orthogonal modulator 14. Phase axes of subcarriers SC1 and SC2 will be described in detail later with reference to FIG. 6.

Chroma signal CHR is supplied to input terminal 11 of mixer 18 and horizontal synchronizing signal 1 SYNC is supplied to input terminal 19 of mixer 18 and signals CHR and SYNC are mixed with luminance signal Y, so that a composite video signal V1 is obtained at an output end of mixer 18. Composite video signal V1 is applied to an analog-digital converter (A/D converter) 20 which is connected to mixer 18.

A/D converter 20 quantizes composite video signal V1 to 8 bits by a clock with a frequency of 4 fsc (fsc: subcarrier frequency) which is synchronized with the burst signal BU. Therefore, a digital video signal DV1 is obtained from A/D converter 20. Digital video signal DV1 is transmitted to switches SW1 and SW2 which are connected to A/D converter 20 in parallel with each other. Switches SW1 and SW2 turn ON or OFF alternately per every one horizontal period. For example, switch SW1 is ON and switch SW2 is OFF for every even horizontal line. While switch SW1 is OFF and switch SW2 is ON for every horizontal odd line. Outputs of switches SW1 and SW2 are transmitted to one horizontal period memories 21 and 22 which are connected to switches SW1 and SW2, respectively.

When switch SW1 is ON and switch SW2 is OFF, one horizontal period memory 21, connected to switch SW1, is in a write mode, while one horizontal period memory 22, connected to switch SW2, is in a read mode. One horizontal period memories 21 and 22 are given addresses assigned for writing and reading of digital video signal DV1, from address control circuit 23 which are connected to one horizontal period memories 21 and 22 through address paths 24 and 25.

Output data read out from horizontal period memories 21 and 22 are transmitted to switches SW3 and SW4 which are connected to one horizontal period memories 21 and 22, respectively. When one horizontal period memory 21 is in the write mode and one horizontal period memory 22 is in the read mode, switch SW3 is OFF and switch SW4 is ON. When one horizontal period memory 21 is in the read mode and one horizontal period memory 22 is in the write mode, switch SW3 is ON and switch SW4 is OFF. Therefore, a combined signal of the outputs from switches SW3 and SW4 becomes a continuous digital video signal, which is transmitted to a digital-analog converter (D/A converter) 26. D/A converter 26 carries out a digital to analog conversion process, and an analog composite video signal is obtained in an output terminal 27 which is connected to D/A converter 26.

The read address sequence for respective one horizontal period memories 21 and 22 can be easily modified. When inverting each read address sequence of one horizontal period memories 21 and 22 at the video signal period in contrast to the write address sequence of the same video signal period, digital video signal DV2 read out from one horizontal period memories 21 and 22 becomes the signal inverted in leftside right. As a result, mirror images are obtained on a display screen (not shown) of television receivers.

Figure 4:
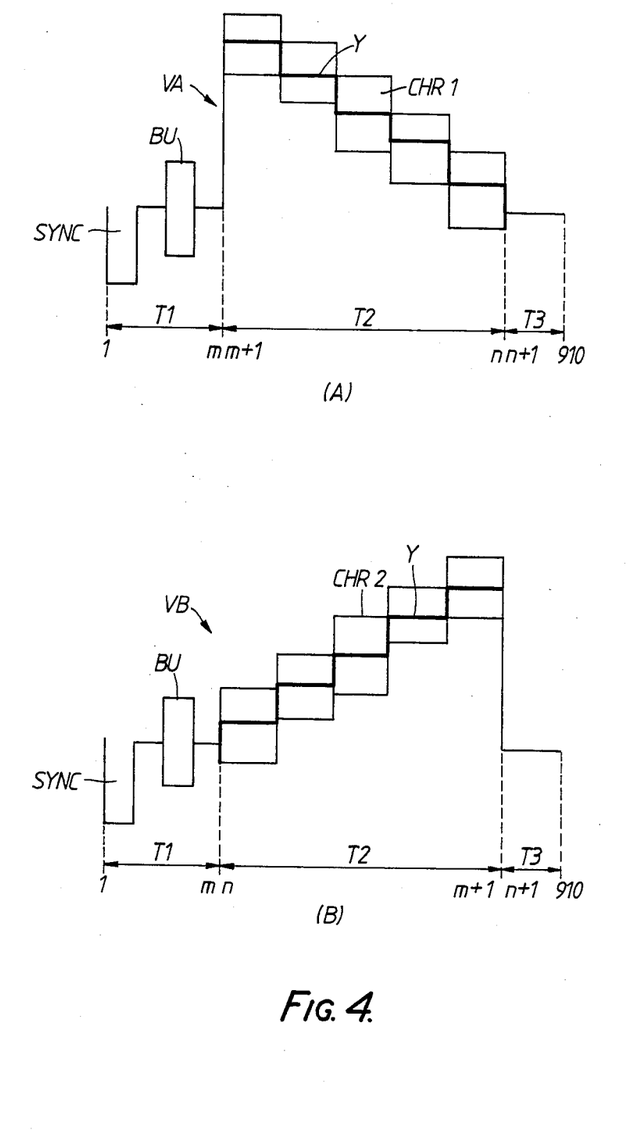
FIG. 4 are diagrams illustrating a one horizontal period signal waveform for explaining an operation of the circuit of FIG. 3 for the time base inversion of the video signal.

The conversion processing of the composite video signal VA will be explained in more detail with reference to FIG. 4. FIG. 4 shows a relation of the composite video signal VA to its modulation axis in the one horizontal period illustrated in FIG. 1, but in more detail in reference to a chroma signal CHR assigned to video signal period T2. Composite video signal VA1 (FIG. 4(A) is comprised of a burst signal BU, a horizontal synchronizing signal SYNC and the abovementioned video signal V1. Burst signal BU and horizontal synchronizing signal SYNC are assigned to leading blanking period T1, while video signal V1 is assigned to video signal period T2 as mentioned above. Video signal V1 is comprised of a luminance signal Y and the abovementioned chroma signal CHR superposed on luminance signal Y. Upon the conversion of composite video signal VA1, burst signal BU and horizontal synchronizing signal SYNC remain the same, while video signal V1 is inverted with respect to its modulation time base so that it is converted to a video signal V2 as shown in FIG. 4(B). Then a composite video signal VA2 as shown in FIG. 4(B) is reproduced in a read mode as described later.

Composite video signal VA1 is quantized by the clock with the frequency of 4 fsc in A/D converter 20, so that the entire extent of the one horizontal period is divided into nine hundred and ten (910) blocks as shown in FIG. 4(A). Leading blanking period T1 is assigned m number of blocks from 1 through m (m: integer), video signal period T2 is assigned (n−m) number of blocks from (m+1) through n (n: integer) and trailing blanking period T3 is assigned (910−n) number of blocks from from (n+1) through 910. These numbers from 1 through 910 constitute addresses for writing or reading digital data corresponding to the respective blocks of the one horizontal period into or out of one horizontal period memories 21 and 22. In every write mode of one horizontal period memories 21 and 22, addressing is carried out in the forward sequence for the entire group of blocks from 1 through 910. However, in the read mode, addressing is divisionally carried out. That is, the addressing for the blocks from 1 through m corresponding to leading blanking period T1, and the blocks from (n+1) through 910, corresponding to trailing blanking period T3, are carried out in the forward sequence, while the addressing for the blocks from (m+1) through n, corresponding to video signal period T2, are carried out in the backward sequence, that is, in the order of n, (n−1), ... (m+2), (m+1). Address control circuit 23 is composed of a read only memory (ROM), for example, and the address data can be obtained merely by designating the clock cycle.

Figure 5:
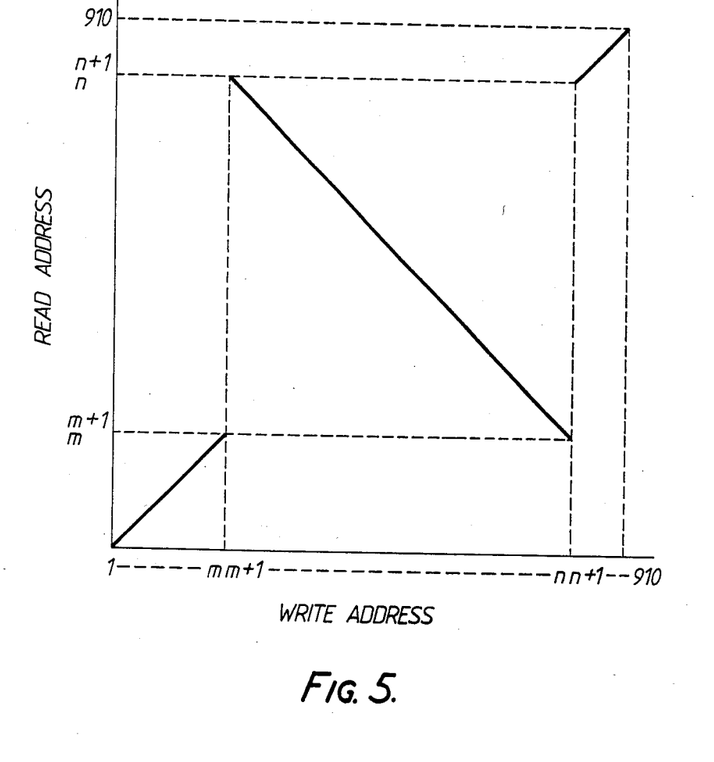
FIG. 5 is a drawing showing a method of address transition in the address control circuit in FIG. 3.

Referring now to FIG. 5, the relationship between the write address and the read address for one horizontal period memories 21 and 22 will now be described. From block 1 through block m, both the write address and the read address are of same sequence with respect to each other. From block (m+1) through block n, the write address and the read address are of opposite sequences with respect to each other, and from block (n+1) through block 910, both the write address and the read address are again of the same sequence with respect to each other.

Figure 6:
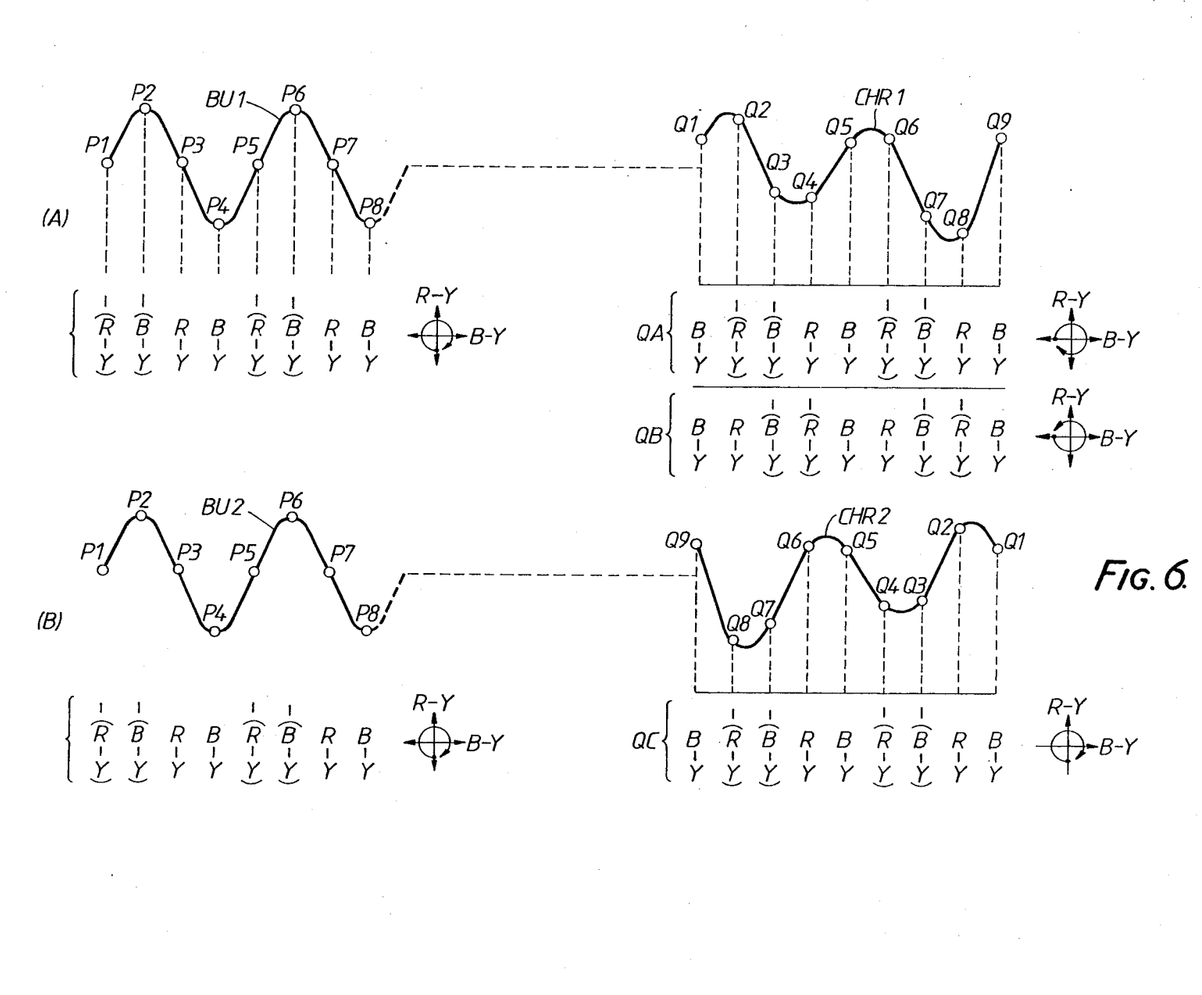
FIG. 6 are diagrams illustrating a phase transition of a chroma signal according to one embodiment of the present invention.

Referring now to FIG. 6, the phase relation of (R-Y) axis and (B-Y) axis components of chroma signals CHR to burst signal BU upon performing the mirror images processing, i.e., the conversion of composite video signal VA1 will now be described.

FIGS. 6(A) and 6(B) show the relationship between burst signal BU and the components of chroma signal CHR, before and after the leftside right inversion is carried out, respectively.

Phases of (R-Y) axis and (B-Y) axis components of chroma signal CHR are determined on the basis of the phase of burst signal BU. Now, regarding phase positions P1 to P8 of burst signal BU1 shown in FIG. 6(A), it is assumed that phase positions P1 and P5 are of −(R-Y) axis, phase positions P2 and P6 are of −(B-Y) axis, phase positions P3 and P7 are of (R-Y) axis, and phase positions P4 and P8 are of B-Y axis. If assuming that a phase position Q1 of a component of chroma signal CHR1 is at (P4+4K) order (K: positive integer) in reference to phase position P4 of burst signal BU1, phase positions Q1 to Q9 of chroma signal CHR1 have a relation QA as indicated in FIG. 6(A) with each other. That is, phase positions Q1 to Q9 of chroma signal CHR1 correspond to axes of (B-Y), −(R-Y), −(B-Y), (R-Y), (B-Y), −(R-Y), −(B-Y), (R-Y) and (B-Y), respectively.

In the present invention, however, the respective components of chroma signal CHR1 of video signal V1 are converted so that they have a phase relation QB as indicated in FIG. 6(A), in which the phases of the respective components of chroma signal CHR1 related to axis (R-Y) are inverted in polarity in comparison to those in phase relation QA. The signal inversion of video signal V1 in video signal period T2 in leftside right is carried out by the (R-Y) components of chroma signal CHR1 and rectangularly modulated by subcarrier SC2 with the phase state of 270° (90° as standard) in orthogonal modulator 14 (see FIG. 3). That is, the (B-Y) components and the (R-Y) components of chroma signal CHR1 are orthogonally modulated by subcarrier SC1 with the phase state of 0° and subcarrier SC2 in orthogonal modulator 14 before the inversion in leftside right is carried out.

As a result, as shown in FIG. 6(B), the phase of chroma signal CHR2 of video signal V2 (see FIG. 1(B)) obtained after the inversion in leftside right matches with the phase determined by burst signal BU1. That is, phase axes of phase positions P1 to P9 of burst signal BU1 shall be set as shown in FIG. 6(B), and when indicating the axes of every phase position Q9 to Q1 of chroma signal CHR2 after the leftside right inversion as the phase relation QC, the phase transition sequence of chroma signal CHR2 matches with the phase transition sequence of burst signal BU1. That is, chroma signal CHR2 after video signal V1 is inverted in leftside right becomes the phase relation that video signal V1 or chroma signal CHR1 originally had. Therefore, the mirror images are displayed with correct hues.

In the above embodiment, subcarriers SC1 and SC2 have the phase states, 0° and 270°, respectively, using the phase of burst signal BU as the standard. However, similar effects can be obtained by a modification of the above embodiment, in which subcarriers SC1 and SC2 are made to have phase states, 180 and 90, respectively.

Figure 7:
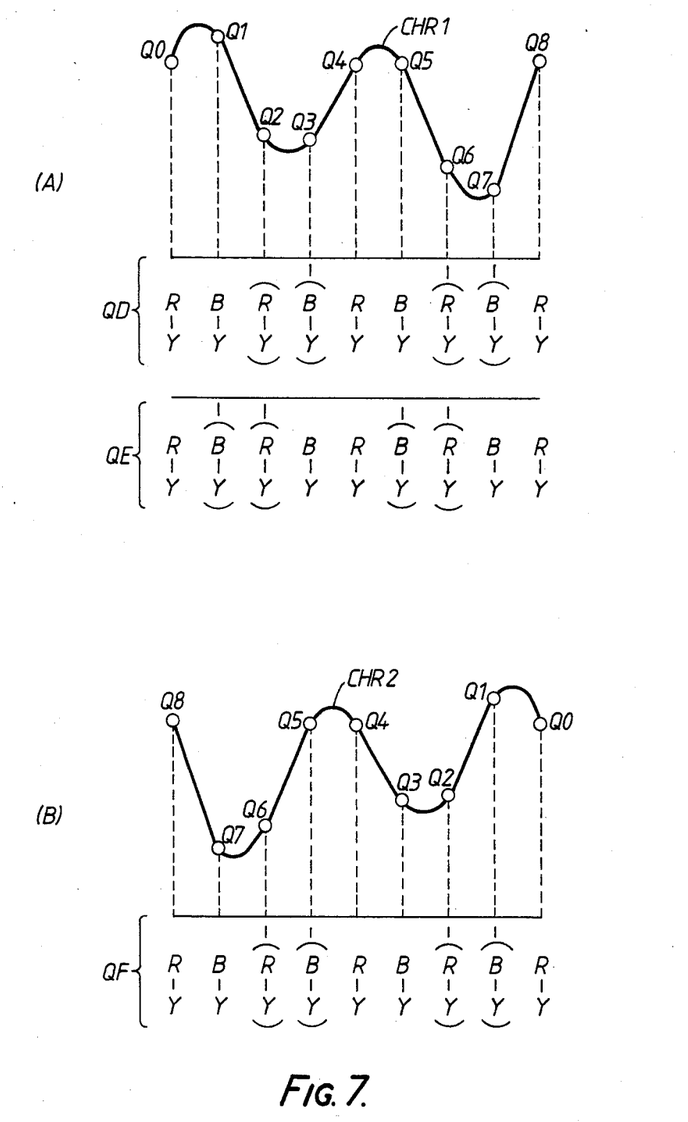
FIG. 7 are diagrams illustrating a phase transition of a chroma signal according to a modification of the embodiment.

Referring now to FIG. 7, the modification will be described below. FIGS. 7(A) and 7(B) show chroma signals CHR1 and CHR2 before and after video signal V1 is inverted in leftside right. Using the phase of burst signal BU as the standard, the phase position of the clock in (4k−1) order is set as a starting position Q0 of the leftside right inversion and Q8 is set to be the terminating position. Referring to the phase of burst signal BU1, phase positions Q0 to Q8 of the respective components of chroma signal CHR1 originally have a relation QD with each other as indicated in FIG. 7(A). However, the respective components of chroma signal CHR1 of video signal V1 are inverted with respect to its modulation time base so that they have a phase relation QE with each other as also indicated in FIG. 7(A), in which the phases of the respective components of chroma signal CHR1 related to the (B-Y) signals are inverted in polarity in comparison to those in phase relation QD. Therefore, the respective components of chroma signal CHR2 after the inversion in leftside right have a relation QF as indicated in FIG. 7(B). That is, also in the modification, chroma signal CHR2, after video signal V1 is inverted in leftside right, has the phase relation that video signal V1 or chroma signal CHR1 originally had. Therefore, the mirror images are displayed with the correct hues.

Figure 8:
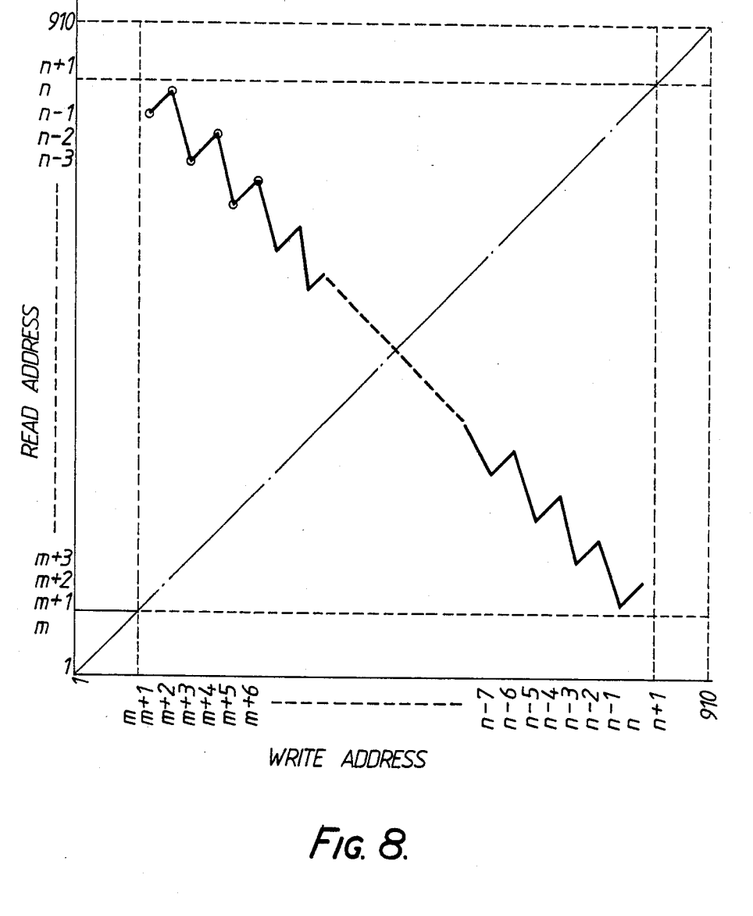
FIG. 8 is a drawing showing another method of address transition in the address control circuits in FIG. 3.
Figure 9:
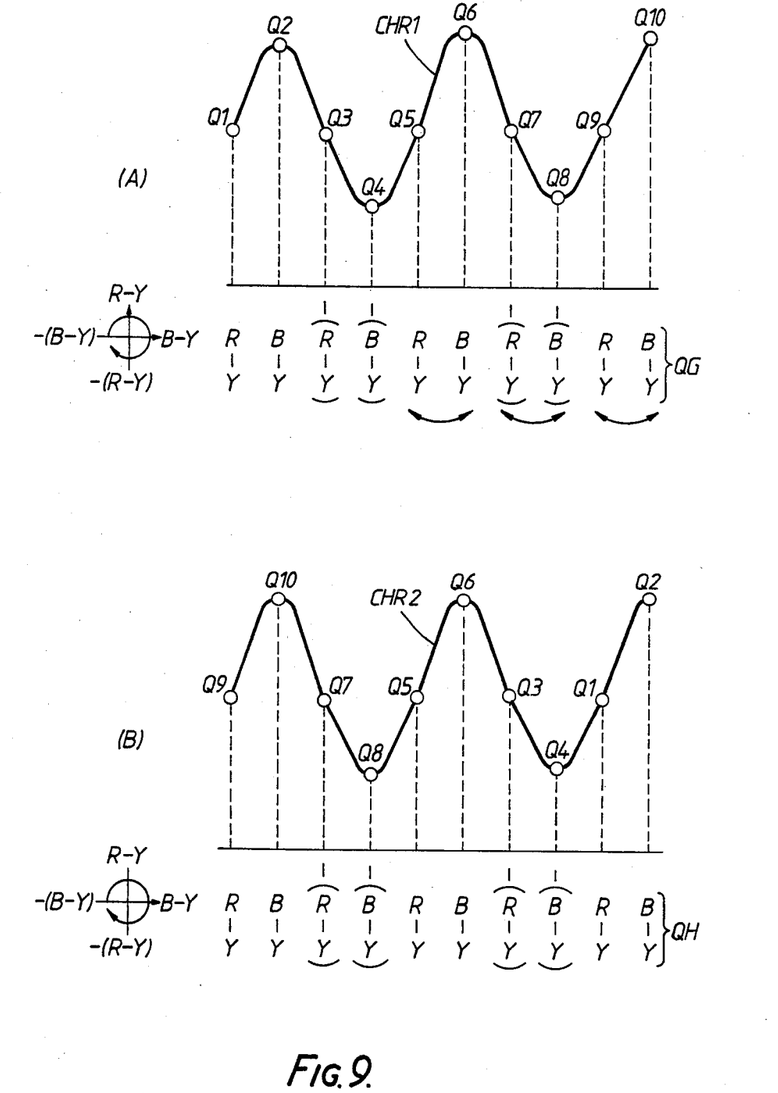
FIG. 9 are diagrams illustrating a phase transition of a chroma signal according to another embodiment of the present invention.

Referring now to FIGS. 8 and 9, there will be described another embodiment of the present invention.

Referring first to FIG. 8, the relationship between the write address and the read address for one horizontal period memories 21 and 22 will be described below. From block 1 through block m, both the write address and the read address are of the same sequence with respect to each other as in the first embodiment. From block (m+1) through block n, the write address and the read address are of opposite sequences with respect to each other, but in a zigzag state, as will be described later. And from block (n+1) through block 910, both the write address and the read address are again of the same sequence with respect to each other as in the first embodiment.

The read sequence for video signal V1 in video signal period T2 is carried out in the order from block n to block (m+1) for every two blocks with the normal order as that addressed in the write operation. That is, every pair of blocks are read in the opposite order, i.e., the order of (n−1, n), (n−3, n−2), (n−5, n−4), (n−7, n−6), . . . , (m+3, m+4), (m+1, m+2).

Referring now to FIG. 9, the respective components of chroma signal CHR upon performing the mirror image processing, to achieve conversion of composite video signal VA1 will be described. FIGS. 9(A) and 9(B) show chroma signals CHR1 and CHR2 before and after video signal V1 is inverted in leftside right. The phases of the respective components of chroma signal CHR are set based on the phase of burst signal BU as the standard. Now regarding phases of components Q1 to Q10 of chroma signal CHR1, it is assumed that components Q1 and Q5 are of (R-Y) phase, components Q2 and Q6 are of (B-Y) phase, components Q3 and Q7 are of −(R-Y) phase, and components Q4 and Q8 are of −(B-Y) phase. Chroma signal CHR1, with the components of the above order QG as shown in FIG. 9(A), is stored in one horizontal memories 21 and 22 in the write mode. In the read mode, chroma signal CHR1 as stored is read out from one horizontal memories 21 and 22 in the backward sequence by every two continuous components, i.e., in the order of every pair (Q9, Q10), (Q7, Q8), (Q5, Q6), (Q3, Q4), and (Q1, Q2). Therefore, chroma signal CHR2 after video signal V1 being inverted in leftside right has the order of components as shown in FIG. 9(B). As seen from FIG. 9(B), component Q9 of chroma signal CHR2 is of (R-Y) phase, component Q10 is of (B-Y) phase, component Q7 is of −(R-Y) phase, and component Q6 is −(B-Y) phase. And the same order is repeated for components Q5, Q6, Q3, Q4, Q1 and Q2. Therefore, the respective components of chroma signal CHR2 after the inversion in leftside right have a relation QH as indicated in FIG. 9(B). That is, in this second embodiment, chroma signal CHR2, after video signal V1 is inverted in leftside right, has the phase relation that video signal V1 or chroma signal CHR1 had. Therefore, the mirror images are displayed with the correct hues.

According to the embodiment as shown in FIGS. 8 and 9, the phases of the first and second subcarriers SC1 and SC2 are held unchanged in the write mode. That is, the phrases are the same as those of the broadcast signals. As a result, television receivers according to this embodiment are not required to be equipped with any angle modulator for the phase shifting.

In the above embodiments, the method and the circuit for the inversion in leftside right is described mainly with reference to the composite video signal. However, the present invention also deals with the inversion of the time base for the chroma signal in the video signal period. Therefore, the invention may be used as a method and circuit for inverting only chroma signals with reference to their time base.

As described above, the present invention provides a method and apparatus for the time base inversion of chroma signals which allows the signals to be inverted in leftside right without disturbing colors or hues of video signals by a relatively simple means such as a phase conversion of subcarriers in orthogonal modulators or a reading of every two continuous components of the stored chroma signal in a backward sequence in comparison to a write sequence.

What is claimed is:

1. A method for time base inversion of chroma signals comprising the steps of:

orthogonally modulating first and second color difference signals by first and second subcarriers;

digitalizing the orthogonally modulated first and second color difference signals;

writing the digitalized orthogonally modulated first and second color difference signals into a one horizontal period memory in a predetermined write address sequence; and processing a phase transition order of the orthogonally modulated first and second color difference signals such that either phase of said first and second subcarriers is deviated by the angle 180° from a standard phase defined by a burst signal to obtain a different phase transition order wherein the orthogonally modulated first and second color difference signals are read out of the one horizontal period memory in a read address sequence such that for a first predetermined amount of data, the write address sequence and the read address sequence are in correspondence, for a second predetermined amount of data, the read address sequence is reverse of the write address sequence, and for a third predetermined amount of data, the write address sequence and the read address sequence are in correspondence.

2. The method of claim 1, wherein said first color difference signal is of the phase 0° in comparison to the standard phase and said second color difference signal is of the phase 270° in comparison to the standard phase of 90°, in a phase of saidcolor difference signal where the read operation is started is at the angle 0° or 180° in comparison to the standard phase.

3. The method of claim 1, wherein said first color difference signal is the phase 90° the standard phase and said second color difference is deviated by the phase 180° from the standard phase of 0°, and a phase of said color difference signal where the read operation is started is at the angle 90° or 270° in comparison to a standard phase.

4. A method for time base inversion of chroma signals comprising the steps of:
   orthogonally modulating first and second color difference signals by first and second subcarriers such that either vector phase of said first and second subcarriers is deviated by an angle of 180° from a standard phase defined by a burst signal;
   adding a plurality of luminance signals and a plurality of burst signals to the orthogonally modulated first and second color difference signals to obtain a first composite video signal;
   digitalizing said first composite video signal to obtain a second composite video signal;
   alternately writing said second composite video signal into first and second line memories in a predetermined write address sequence; and
   reading said alternately written second composite video signal from either of said first and second line memories in a non-write mode in a backward address sequence in comparison to the predetermined write address sequence for a time period during an active video signal until termination of said active video signal.

5. Time base inversion of chroma signals circuit, having first and second subcarriers wherein either of said first and second subcarriers have vector phases deviated by an angle of 180° from a standard phase defined by a burst signal, comprising:
   means for orthogonally modulating said first and second color difference signals by first and second subcarriers to obtain orthogonal modulation signals;
   means for synthesizing said orthogonal modulation signals with said burst signal, a luminance signal, and a synchronizing signal to obtain a plurality of analog composite video signals;
   analog to digital converter means for converting said analog composite video signals to digital composite video signals;
   first switch means for supplying the output of said analog to digital converter means alternately to first and second one horizontal memories;
   reading said alternately supplied output from either of said first and second one horizontal memories in a backward sequence in comparison to the sequence the output was supplied to said memories; and
   digital to analog converter means for converting said digital composite video signals read out from said first and second one horizontal memories to analog composite video signals.

6. Time base inversion of chroma signals circuit comprising;
   analog to digital converter means for converting a plurality of composite video signals to digital composite video signals;
   first switch means for supplying an output of said analog to digital converter means alternately to first and second one horizontal memories;
   address control circuit means for supplying a plurality of write addresses to one of said first and second one horizontal memories selected by said first switch means in a predetermined writing address sequence and for supplying a plurality of read addresses to the other of said first and second one horizontal memories in an order of every two continuous addresses in a reverse address sequence in comparison to the predetermined writing address sequence; and
   reading out said supplied output from either of said first and second one horizontal memories in a reverse address sequence in comparison to the sequence the output was supplied to said memories for a sequence of every two continuous addresses and reading out said supplied output in the same sequence the output was supplied to the memories for every other two continuous addresses during a predetermined time period for an active video signal until termination of said active video signal.

7. The method of claim 6, wherein said processing step includes reading said first and second color difference signals in an order of every two continuous components in a reverse address sequence in comparison to the write address sequence.

* * * * *